July 5, 1966

M. HATTAN 3,259,398

BICYCLE DRIVE

Filed Dec. 9, 1964

Mark Hattan
INVENTOR.

BY William P. Green
ATTORNEY

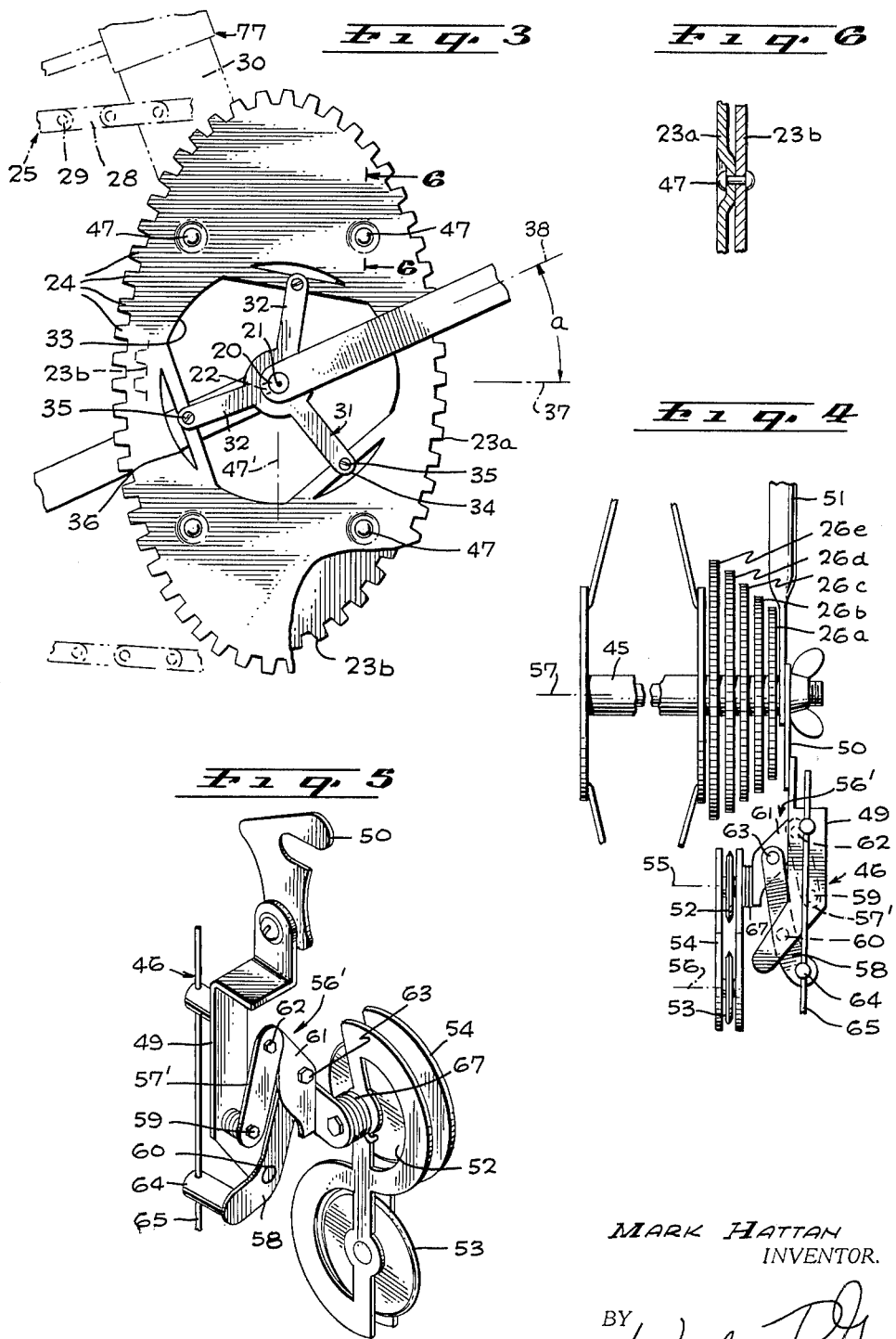

July 5, 1966  M. HATTAN  3,259,398
BICYCLE DRIVE
Filed Dec. 9, 1964  5 Sheets-Sheet 3
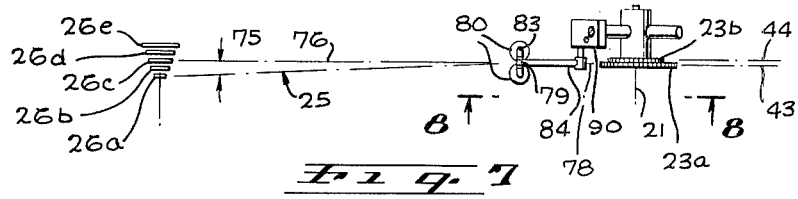
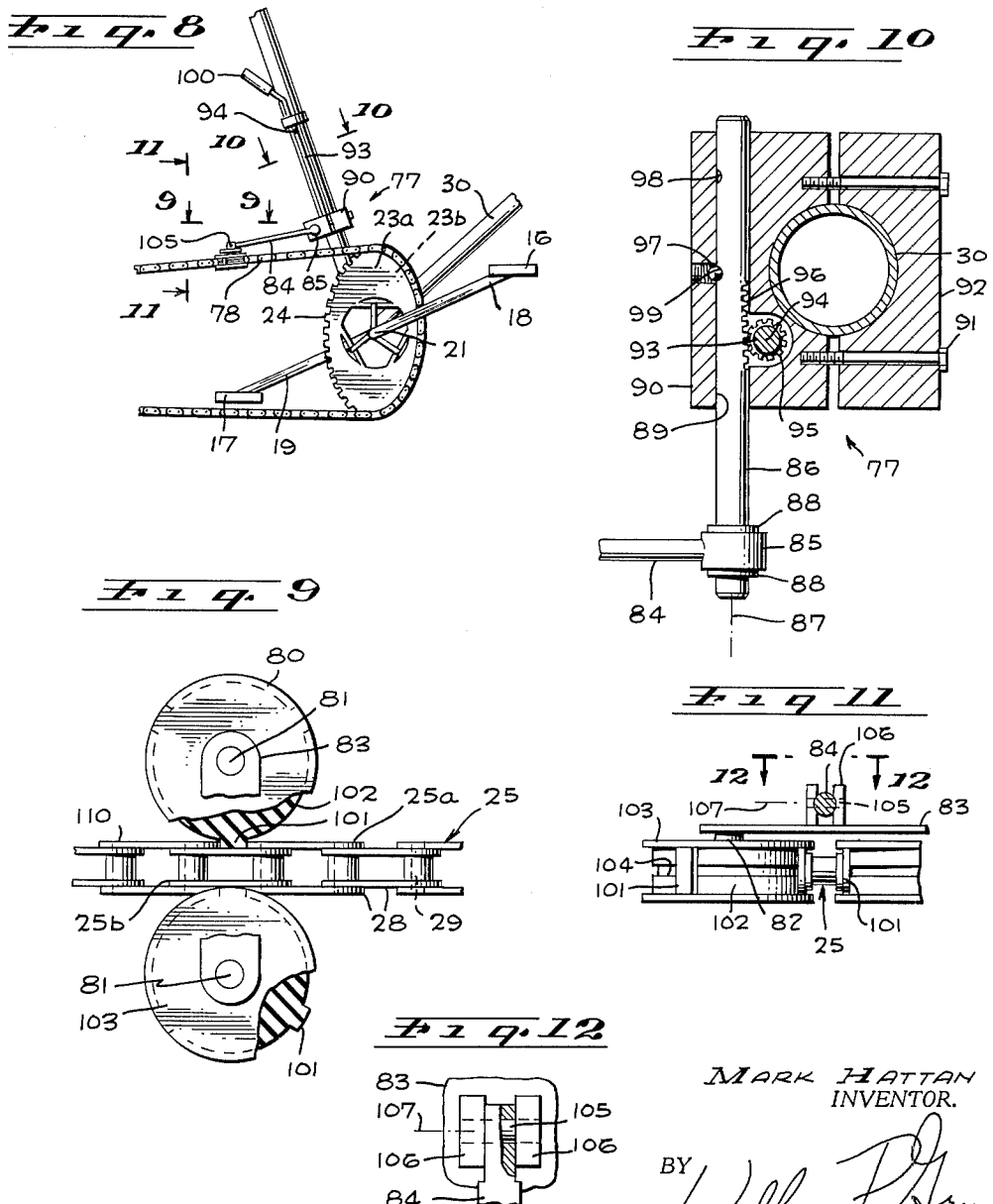
MARK HATTAN
INVENTOR.
BY William P. Green
ATTORNEY July 5, 1966 M. HATTAN 3,259,398
BICYCLE DRIVE
Filed Dec. 9, 1964 5 Sheets-Sheet 4

MARK HATTAN
INVENTOR.

BY William P. Green
ATTORNEY

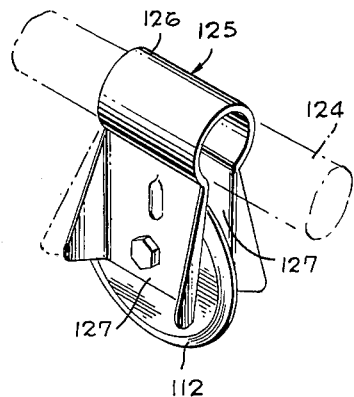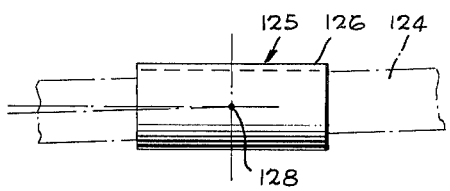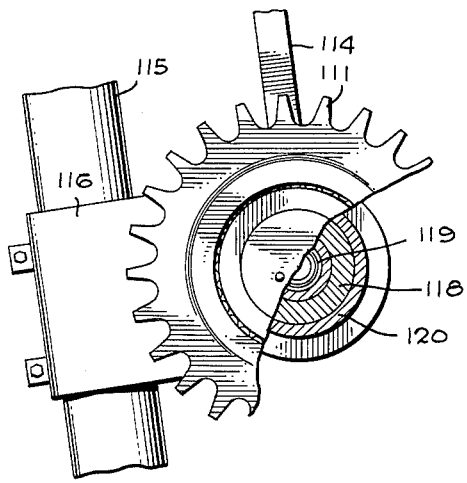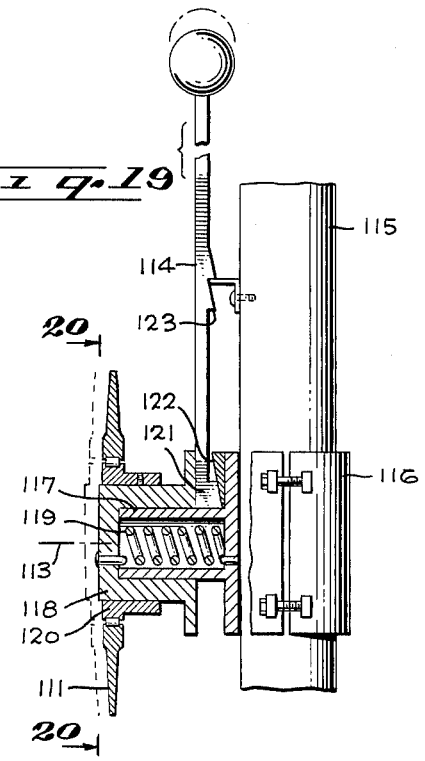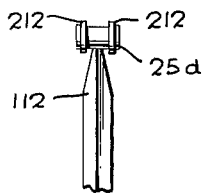

United States Patent Office 3,259,398
Patented July 5, 1966

3,259,398
BICYCLE DRIVE
Mark Hattan, South Pasadena, Calif., assignor of one-fourth to William P. Green, San Marino, Calif.
Filed Dec. 9, 1964, Ser. No. 416,978
16 Claims. (Cl. 280—236)

This application is a continuation-in-part of my co-pending application Serial Number 338,266, filed December 23, 1963, now abandoned, on "Bicycle Drive Mechanism."

This invention relates to an improved type of pedal actuated drive for a bicycle or the like.

In riding a bicycle, as the rider actuates the pedals through their 360° rotary path, there are certain times during each cycle of rotation when the rider can exert considerably more force on the pedals than at other times. Specifically, when either of the two pedals is in a forwardly projecting position, the rider can easily apply a strong downward force on that pedal, and can therefore apply a relatively large torque to the drive sprocket. When the pedal is pointed upwardly or downwardly, on the other hand, the weight of the rider has relatively little effect in tending to turn the pedals and sprocket wheel, and consequently the only substantial force which can in that position be exerted against the pedals is whatever muscular force the rider is capable of exerting in a forward or rearward direction. This force is very small as compared with that exerted by the rider when the pedal is directed forwardly, and is also much smaller than the force which can be exerted upwardly against a rearwardly directed pedal if the rider is using toe clips.

A pedal actuated drive embodying the present invention is so designed as to automatically compensate for the above discussed inequalities in foot applied torque which inherently occur during each revolution of a pair of bicycle pedals. More specifically, the drive includes compensating means so constructed that, as the pedals are driven by foot pressure through a cycle of operation, the effective torque transmission ratio and the effective speed transmission ratio of the drive system automatically vary in accordance with changes in the positioning of the pedals. When the pedals are in their forwardly and rearwardly directed positions, the present drive system is in what may be considered a "high gear" condition, in which relatively small movement of the pedals produces a relatively great movement of the bicycle; whereas when the pedals are directed upwardly and downwardly, the transmission is in a "low gear" condition, in which much greater pedal movement is required to produce the same movement of the bicycle. Desirably, the change from one of these conditions to the other is progressive and continual, so that the drive is continually changing its effective transmission ratio, to at all times maintain an optimum relationship between the available torque and the drive ratio. Stated differently, the automatic variation in torque and speed transmission ratios increases the uniformity of the torque applied to the rear wheel of the bicycle, by compensating for variations in the torque applied at the pedals. In the most desirable condition, the torque at the rear wheel is substantially uniform through an entire revolution of the pedals so long as load conditions and other conditions remain the same.

The means utilized for varying the torque and speed ratios include a unique power transmitting wheel, desirably a sprocket wheel, which is oblong is effective shape, rather than circular. This wheel engages an endless flexible drive structure, desirably a conventional flexible chain (or perhaps in some instances a flexible belt or the like) in a relation transmitting power between the wheel and the chain, belt, or other endless structure. For best results, the oblong wheel is connected directly to, and turns about the axis of, the pedals, to in this way be directly keyed to the pedal rotation.

In an automatic variable ratio drive of this type, there is a decided tendency for the oblong drive wheel to throw the chain or other endless member out of engagement with that wheel, and thus break the drive to the rear wheel of the bicycle. This result occurs because the continual change in position of the upper run of the chain, caused by the continual change in effective size of the oblong rotating wheel, tends to vibrate the chain in a pattern which may displace it entierly off of the sprocket wheel. More specifically, there is a tendency for both a vertical vibration or oscillation and a less apparent horizontal oscillation, which together may produce a composite generally circular oscillatory movement having extremely adverse effects on the drive mechanism. Further the vertical oscillation tends to require corresponding repeated changes in effective length of the chain to properly mesh with the oblong wheel in all of its positions.

An important object of the present invention is to provide an arrangement for eliminating or minimizing the effects of these oscillatory movements and thereby assuring against displacement of the endless member from the oblong wheel. As will appear, the effect of the vertical oscillatory movement is reduced by spreading apart the upper and lower runs of the chain or other endless member at a location spaced from the oblong wheel in a manner reducing the tendency to require repeated changes in chain length to accommodate changes in effective size of the oblong wheel. Preferably, the runs are spread apart to a dimension between the maximum and minimum dimensions or diameters of the oblong wheel, and for best results substantially midway between these dimensions.

In order to allow for actuation of the drive to any of a plurality of different speed conditions, it is desirable that the chain be shiftable selectively into engagement with any of several different rear sprocket wheels, or into engagement with any of two or more of the oblong wheels at the front of the chain, with the chain preferably being shiftable at both locations. However, this speed changing movement of the chain at either location results in the front and rear sprockets being out of line with one another in at least one drive condition. Further, when the two active sprockets are thus out of line, this causes the previously mentioned tendency for horizontal oscillation to occur (as will be discussed in greater detail at a later point). To prevent such horizontal oscillation, I provide a unique guide structure which engages the upper run of the endless member preferably near the oblong wheel, and guides it onto the oblong wheel along an accurately aligned non-oscillating path which lies essentially within the plane of that wheel. The guide desirably takes the form of roller means, which in one preferred form of the invention consists of a roller engageable against the underside of the upper run of the endless member. Also, the guide may serve the secondary function of shifting the upper run between positions of engagement with two different forward sprocket wheels.

The seat of a bicycle is normally positioned somewhat farther rearwardly than the pedals. As a result the rider can exert his maximum force on the pedals not directly downwardly but rather in a generally downward but slightly forward direction. For this reason, it is preferred in the present invention that the pedals be positioned so that one of them extends forwardly and slightly upwardly when the oblong wheel is in a position to have its maximum effective diameter.

The above and other features and objects of the present invention will be better understood from the following detailed description of the typical embodiments illustrated in the accompanying drawings, in which:

FIG. 1 is a side view of a bicycle having two oblong sprocket wheels constructed in accordance with the invention;

FIG. 2 is a greatly enlarged diagrammatic representation of the oblong sprocket wheel drive of FIG. 1;

FIG. 3 is a side view of the oblong wheels themselves;

FIG. 4 is a view taken on line 4—4 of FIG. 1;

FIG. 5 is a perspective view of the rear chain spreading mechanism;

FIG. 6 is a section of line 6—6 of FIG. 3;

FIG. 7 is a section taken on line 7—7 of FIG. 1;

FIG. 8 is a side view taken on line 8—8 of FIG. 7;

Figure 14:
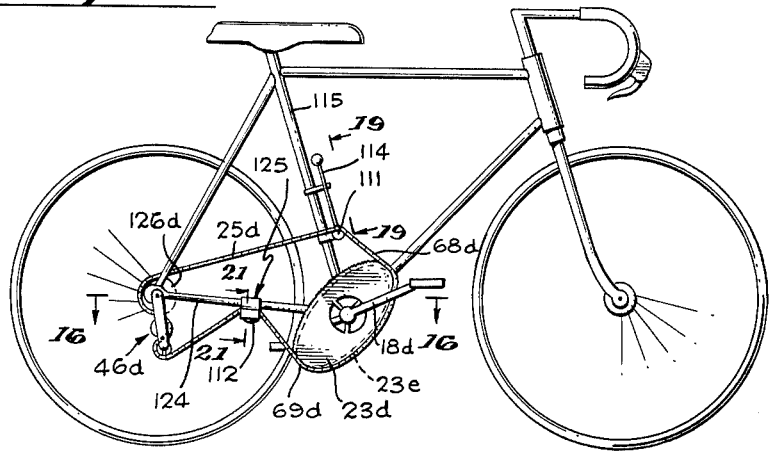
Figure 15:
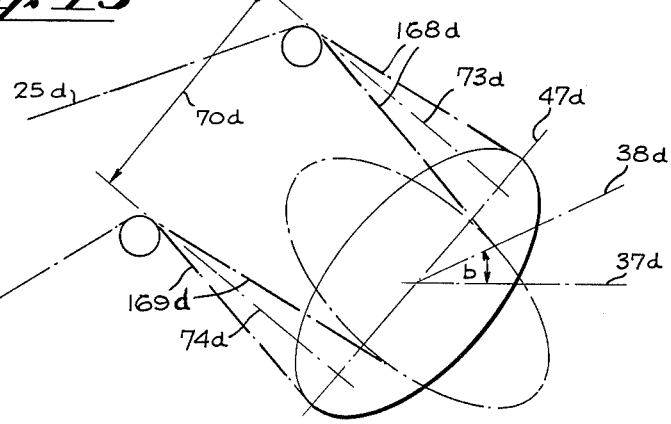
Figure 16:
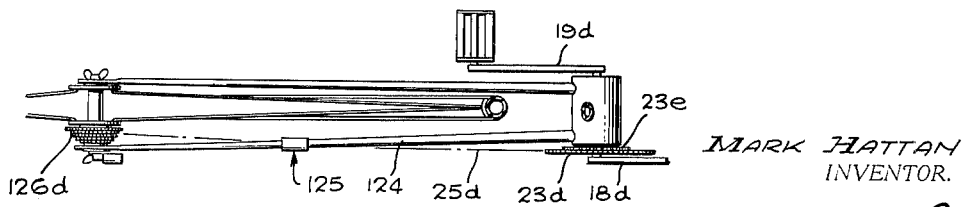

FIGS. 9, 10 and 11 are views taken on lines 9—9, 10—10 and 11—11 respectively of FIG. 8;

FIG. 12 is a section on line 12—12 of FIG. 11;

FIG. 13 shows a variation of the invention;

FIG. 14 is a side view of a bicycle having another sprocket drive arrangement constructed in accordance with the invention;

FIG. 15 is a diagrammatic representation of the FIG. 14 sprocket drive;

FIG. 16 is a fragmentary essentially horizontal section taken on line 16—16 of FIG. 14;

FIG. 17 is a perspective representation of one of the idler wheels of FIG. 14;

FIG. 18 is a plan view of the mounting bracket for the FIG. 17 idler wheel;

FIG. 19 is an enlarged fragmentary view taken on line 19—19 of FIG. 14;

FIG. 20 is a fragmentary view on line 20—20 of FIG. 19; and

FIG. 21 is a section on line 21—21 of FIG. 14.

Referring first to FIG. 1, I have shown at 10 a bicycle having the usual frame 11, seat 12, handle bars 13, and front and rear wheels 14 and 15. The bicycle is driven by two conventional pedals 16 and 17 which are pivotally connected to a pair of mounting arms 18 and 19 connected to opposite ends of a shaft 20 (see FIG. 3) which is rotatably journalled within a frame carried bearing for rotation relative to the bicycle frame and with the pedals about a transverse horizontal axis 21 (parallel to the axes of wheels 14 and 15). The pedals 16 are of course pivoted to arms 18 and 19 for individual rotary movement about two axes extending parallel to but spaced at opposite sides of main axis 21 of the pedal structure. As is customary, arms 18 and 19 are assumed to extend transversely of axis 21, and project in diametrically opposite directions from that axis. The pedal arms are keyed to shaft 20 in any convenient manner, as by set screws such as that designed at 22 in FIG. 3.

The oblong (preferably elliptical) sprocket wheels with whose design the present invention is particularly concerned are represented at 23a and 23b in FIGS. 1 and 3. These sprocket wheels may be considered as lying in two vertical parallel planes 43 and 44 (FIG. 7) disposed transversely of axis 21 of the pedals. The sprocket wheels may be formed of sheet metal, a suitable stiff plastic, or other essentially rigid material, which may be stamped, machined, molded, or otherwise formed to the illustrated configuration. About its periphery, each of the sprocket wheels has a series of conventional sprocket teeth 24, for engaging the usual drive chain 25 of the bicycle. Chain 25 is endless and extends rearwardly about, selectively, any one of a series of rear circular sprocket wheels 26a, 26b, 26c, 26d and 26e (FIG. 4), which are connected to and drive the shaft 45 of rear wheel 15. In association with the several sprocket wheels 26a, 26b, 26c, 26d and 26e, I utilize spreading mechanism represented generally at 46 which serves to spread the rear portion of the chain in a manner reducing the effects of vertical oscillation thereof, and by which the rider is also able to shift the chain from one rear sprocket to another. This spreading and shifting mechanism may include a body part 49 which is secured by a connector 50 to the frame members 51 to which rear wheel 15 is rotatably mounted. Body 49 is rigidly held in fixed position relative to the frame of the bicycle, and movably mounts two small spring urged take up wheels 52 and 53 for rotation about individual parallel axes 55 and 56 (FIG. 4) disposed parallel to the axis 57 of rear wheel 15. Carrier 54 and its wheels 52 and 53 are shiftable laterally (along axes 55 and 56) between five different possible positions in which wheels 52 and 53 lie in the vertical planes of the five sprocket wheels 26a, 26b, 26c, 26d and 26e respectively. The structure for enabling such lateral movement of carrier 54 and its wheels 52 and 53 may take the form of a parallelogram mounting arrangement 56' having two parallel arms 57' and 58 pivoted at two spaced locations 59 and 60 to body 49. A link 61 is pivoted at two correspondingly spaced locations 62 and 63 to end portions of arms 57' and 58, with the four pivot points 59, 60, 62 and 63 defining a parallelogram. The lower end of arm 58 is connected at 64 to a control wire 65 which is actuable upwardly and downwardly in FIG. 4 by manual actuation of a shifting lever 66 (FIG. 1) which is controllable by a rider of the bicycle. Carrier 54 is mounted to element 61 by means of a spring unit 67 (FIG. 5), with this spring unit acting to swing carrier 54 in a clockwise direction as viewed in FIGS. 1 and 2, about the location of unit 67, so that the lower wheel 53 is urged rearwardly to take up slack in chain 25. As will be apparent from FIG. 4, upward and downward movement of control wire 65 acts through the parallelogram mounting structure 56 to shift carrier 54 and its rollers 52 and 53, as well as the connected chain 25, bodily between its four different positions of engagement with the various circular sprocket wheels 26a, 26b, 26c, 26d and 26e, while at all times maintaining wheels 52 and 53 in a common vertical plane by virtue of the parallelogram type mounting. With reference to FIGS. 1 and 2, it is noted that the chain 25 passes rearwardly about one of the sprocket wheels 26a, 26b, 26c, 26d and 26e, downwardly at the rear side of that wheel, then forwardly across the front side of wheel 52, and about the rear side of lower wheel 53, before returning forwardly to the oblong sprocket wheels.

As seen in the upper portion of FIG. 3, the chain 25 may be a completely conventional chain, having successive links 28 pivoted together by pivot pins 29, and forming openings or sockets into which the teeth 24 of sprocket wheels 23a and 23b (and the corresponding teeth of sprocket wheels 26a, 26b, 26c, 26d and 26e) project to provide a positive drive between the chain and the sprocket wheels.

At the inner side of pedal arm 18, between this arm and the frame members 30 of the bicycle, shaft 20 rigidly carries a sprocket mounting web 31 (see FIG. 3), having three arms 32 projecting radially outwardly from axis 21 at evenly circularly spaced locations. This web 31 is received within a central aperture 33 formed in sprocket wheel 23a. The radially outer extremities 34 of arms 32 are rigidly connected to sprocket 23a, typically by three screws 35, such as are customarily employed in securing conventional circular sprocket wheels to the pedals. Wheel 23a may be apertured in any convenient manner to reduced the weight of the sprocket wheel, while still maintaining sufficient strength to transmit the required power. For example, apertures are illustrated in FIG. 3 at 36, in addition to the main relatively large central aperture 33. It will of course be understood that, if desired, the central web 31 may be formed integrally with sprocket wheel 23a, or the sprocket wheel may be a single unapertured piece of material suitably connected at its center to shaft 20.

The second sprocket wheel 23b may be smaller than wheel 23a, and be rigidly secured to wheel 23a in closely spaced parallel relation with respect thereto, with the connection typically being made by rivets or screws as represented at 47, or by welding or any other convenient means.

The connection between sprocket wheel 23a and shaft 20 is such that this sprocket wheel (and the connected wheel 23b) are always retained in a predetermined fixed position relative to the arms 18 and 19 which carry the pedals. In the arrangement illustrated in FIGS. 1, 2 and 3, this relationship is such that the radial line 37 at the minimum diameters of oblong sprocket wheels 23a and 23b (i.e. the minor axis of the wheels) circularly leads the line or axis 38 representing the direction in which pedal mounting arms 18 and 19 extend, as the parts appear when viewed from the side. Preferably, minor axis 37 leads line 38 by an angle "a" between about 10 degrees and 40 degrees, for best results about 25 degrees. The major axis of the ellipses formed by sprocket wheels 23a and 23b is represented at 47' in FIG. 3. It may also be stated that, when the major axes of the sprocket wheels are in the directly vertical position of FIG. 1, the pedal line 38 should desirably be disposed approximately perpendicular to a force application line extending from the center of seat 12 to the axis about which the pedals turn. To define the pedal position in terms of the relationship between the sprocket wheels 23a (or 23b) and the upper run 68 of chain 25, it is preferred that when the sprocket wheel is in a position such that, as run 68 extends forwardly, it first contacts the oblong sprocket wheel at a maximum or major diameter location (FIG. 3), the pedals should at that instant be in a position such that one of them is inclined upwardly and forwardly at the above discussed angle "a" (between about 10 and 40 degrees, and preferably about 25 degrees) with respect to a horizontal line or plane such as that represented at 37 in FIG. 3, and also in that chain position the pedal line 38 should be approximately perpendicular to the mentioned force application line. As will be brought out at a later point, this last discussed relationship should be maintained regardless of the angle at which the chain may approach the sprocket wheel.

FIG. 2 illustrates somewhat diagrammatically the manner in which upper run 68 and lower run 69 of chain 25 are required to oscillate upwardly and downwardly during operation of the pedal actuated mechanism. More particularly, FIG. 2 shows in full lines a condition in which the major axis 47' of an engaged one of the elliptical sprocket wheels 23a or 23b is in directly vertical position, so that upper run 68 of the chain is in its highest position and lower run 69 is in its lowest position. In broken lines, FIG. 2 illustrates the condition of the apparatus when the sprocket wheel has turned through 90 degrees to a position in which its minor axis extends directly vertically, so that the upper and lower runs of the chain assume the altered position represented at 68a and 69a. Thus, the forward portion of each run of the chain is required to oscillate vertically through a distance corresponding to one half of the difference between the major and minor diameters of the engaged oblong sprocket.

The sprocket wheels 26a, 26b, 26c 26d and 26e at the rear wheel location are normally much smaller than the forward sprocket wheels 23a and 23b, and preferably are all smaller in diameter than the minimum or minor diameter of each of the two forward sprocket wheels 23a and 23b. Consequently, if the chain at the rear location passed about only wheel 26a, 26b, 26c 26d and 26e and did not pass about the spreading wheels 52 and 53, the upper and lower runs of the chain would be required to flare rapidly apart as they advanced forwardly to the front sprocket wheel. As a result, the vertical oscillation of the forward ends of the chain runs would tend to produce substantial slack in the chain in the broken line condition of FIG. 2, and would make the chain very tight on the sprocket wheels in the full line condition, and would therefore require the equivalent of a chain which was continually changing in length. A primary purpose in providing spreader wheels 52 and 53 is to minimize and compensate for this effect. In particular, the wheels 52 and 53 spread the lower run 69 of the chain downwardly, at a location rearwardly of the main oblong sprocket wheels, so that the effective spacing of the upper and lower runs of the chain rearwardly of the sprocket wheels 23a and 23b, and as they advance forwardly toward the sprocket wheels, is an increased distance designated 70 in FIG. 2. This spread dimension 70 is substantially closer than the effective diameter 71 of each of the rear sprocket wheels 26a, 26b, 26c, 26d and 26e to a dimension 72 (right hand portion of FIG. 2) which is midway between the major and minor dameters of the engaged forward elliptical sprocket 23a or 23b. Preferably, the spread dimension 70 is between the major and minor diameters of each of the forward sprocket wheels 23a and 23b (that is, not smaller than the minor diameter nor greater than the major diameter), and for best results the spread dimension 70 corresponds approximately to, and desirably substantially exactly to, that optimum dimension 72. The two forward sprocket wheels may have their major and minor diameters so selected that dimension 70 corresponds to the dimension 72 of each of the two forward sprocket wheels (in which case one wheel would have a smaller major diameter but larger minor diameter than the other); or the diameters may be so selected that the dimension 70 corresponds to the dimension 72 of only a preferred one of the oblong sprocket wheels which it is contemplated may be used more than the other (usually the larger wheel), if, as in FIG. 3, the diametral relationship is such that the optimum condition cannot be attained for both sprocket wheels; or if preferred, the dimension 72 may be midway between the dimensions 72 of the two sprocket wheels (but between the major and minor diameters of both wheels).

When dimension 70 of FIG. 2 corresponds exactly to dimension 72 of the sprocket wheel in use (the optimum condition), upper run 68 of the chain is required to lengthen only a very negligible amount in oscillating upwardly from the intermediate position 73 of FIG. 2 to the upper full line position of that run, and similarly is required to lengthen only the same negligible amount in shifting downwardly from location 73 to the broken line position 68a. Thus, the upper run may remain at substantially the same length during the entire cycle of vertical oscillation between positions 68 and 68a. The same is true of lower run 69 as it oscillates between positions 69 and 69a, and through an intermediate position 74 which is parallel to intermediate positions 73 of the upper chain. Consequently, rear wheels 52 and 53, in the illustrated spread condition of the rear portion of the chain, are required to take up only a very small amount of chain length as the forward sprocket wheel rotates. When these wheels 52 and 53 shift to positions in which the chain engages different ones of the rear sprocket wheels 26a, 26b, 26c, 26d and 26e, the spring take up afforded by wheels 52 and 53 of course is required to take up a substantial amount of variation in the effective length of the chain, but the optimum dimensioning of the rear spaced relationship relative to the forward elliptical sprocket wheel diameters minimizes the added take up required as a result of the use of elliptical drive sprockets.

As has been mentioned previously, there is a tendency in an arrangement of the present type for a horizontal oscillation of the chain at the location of the forward sprocket wheel, as well as the discussed vertical oscillation. To bring out the reason for this tendency, reference is made to FIG. 7 which illustrates in plan view the chain and its engagement with the rear and forward sprocket wheels. Since a multiplicity of sprocket wheels are employed at either or both of the forward and rear locations, it is impossible to always assure that the particular rear sprocket wheel in use at a certain instant will be directly aligned in a front to rear direction or plane with the particular forward sprocket wheel then in use. Consequently, as illustrated in FIG. 7, the chain tends to advance forwardly at a small angle (approximately angle 75 in FIG. 7) to a true front to rear direction or plane 76 (the plane containing the particular forward sprocket wheel then in use). Thus, the chain approaches the forward sprocket wheel at this slight angle. The lateral oscillation occurs because, since the forward sprocket wheel is elliptical and not circular, the upper run of the chain does not always first engage the sprocket wheel directly vertically above its rotary axis 21. Instead, when the major axis 47' of the elliptical sprocket wheel is offset circularly in a counter-clockwise direction from the position of FIG. 3 (that is, is just approaching the position of FIG. 3), the upper run of the chain will first engage the wheel at a location rearwardly of a vertical plane containing rotary axis 21. As the sprocket wheel continues to advance in a clockwise direction in FIG. 3, the point of initial contact of the upper run of the chain with the wheel advances rightwardly, to a position considerably to the right of a vertical plane containing axis 21. With reference to FIG. 7, this front or rear shifting of the point of initial contact of the chain with the elliptical sprocket wheel means that, unless prevented in some way, there will be a tendency, because of the angular relationship illustrated at 75, for the forward end of the upper run of the chain to shift slightly in a lateral direction as the point at which it meets plane 76 shifts forwardly and rearwardly. This lateral shifting movement is sufficient to throw the chain off of the sprocket wheel under many operating conditions, particularly when taken in conjunction with the vertical oscillation which has been discussed above.

To prevent such horizontal oscillation of the forward end of the chain, I provide unique guide means 77 (FIGS. 1 and 7 through 10) for continually guiding the upper power transmitting run of the chain at a location directly rearwardly of its point of engagement with the forward sprocket wheel, so that the forward portion 78 of the chain (FIG. 7) always approaches the engaged forward elliptical sprocket wheel along a line directly within the plane of that wheel. In other words, the upper run of the chain advances at the slight angle 75 with respect to a true front to rear direction up to the point 79, and then advances forwardly from that point of the elliptical sprocket wheel in a precisely accurate front to rear direction.

The guide unit at 79 for attaining this purpose may include a pair of identical rollers 80 which turn about parallel generally vertical axes 81, and which engage opposite sides of chain 25. These rollers 80 may be rotatably mounted by individual shafts 82 (FIG. 11) to an upper mounting plate 83 by which the shafts are rigidly carried, which plate may be pivotally connected to the end of a swinging arm 84 (FIGS. 7, 8, 11 and 12). This connection may be made by means of a pivot pin 105 extending through arm 84 and through a pair of upstanding lugs 106 which are rigidly secured to plate 83, to enable relative pivotal movement of plate 83 and its carried parts about an axis 107 which is parallel to axis 21. Arm 84 is in turn connected to a bushing part 85 (FIG. 10) which is mounted about an externally cylindrical shaft 86 for swinging movement about an axis 87 disposed transversely of the front to rear plane 76 of FIG. 7, and disposed parallel to the axes of the front and rear wheels of the bicycle and all of the sprocket wheels. Bushing 85 is a close fit on shaft 86, and is retained against axial movement relative thereto by snap rings 88 received within grooves in shaft 86, or by other appropriate thrust bearing elements.

Shaft 86 is mounted for shifting movement along its longitudinal axis 87 between the position of FIG. 7 in which wheels 80 guide the chain directly forwardly onto the first sprocket wheel 23a, and a second position in which wheels 80 direct the chain directly forwardly onto the second oblong sprocket wheel 23b. The shaft is mounted for such axial movement by reception within a cylindrical guideway 89 formed in a block 90 which is clamped by screws 91 and a clamping element 92 in fixed position to one of the frame members 30 of the bicycle. An actuating rod 93 is journalled within block 90 for rotation about a generally vertical axis 94 (FIGS. 8 and 10), and has gear teeth 95 within block 90 engageable with rack teeth 96 in a manner causing movement of shaft 86 along axis 87 in response to rotary movement of the control rod 93. Shaft 86 is releasably retainable in each of its two set positions by reception of a spring pressed detent 97 within one of two notches 98 and 99 formed in shaft 86. The resistance to axial movement of shaft 86 which is offered by detent 97 is sufficient when this ball detent is received in either of the notches 98 or 99 to positively retain shaft 86 and its carried parts against any axial movement in response to lateral forces exerted by chain 25 against rollers 80 as a result of the angularity of the chain at 75. The detents may however be easily overcome by manual swinging of the upper inclined end 100 of shaft 93 by a person riding the bicycle.

As seen in FIG. 9 the chain 25 is of conventional construction, having alternate side links 25a and narrow links 25b. In order to effectively guide chain 25, rollers 80 preferably have alternate radially outwardly projecting lug portions 101 and intermediate inwardly recessed portions 102, so dimensioned as to mesh with the wide and narrow links of the chain in a manner illustrated in FIG. 9, and thereby simultaneously engage both sides of the chain in confining relation substantially continuously. Rollers 80 also preferably have upper and lower annular rims or flanges 103 (FIG. 11), engageable with the upper and undersides of the chain in a manner effectively locating the chain vertically between these flanges, and in proper engaged relationship with the two rollers. To receive the slightly outwardly projecting ends 110 of pivot pins 29, rollers 102 may contain annularly extending grooves 104 (FIG. 11). It is also contemplated that the rollers may desirably be formed of a slightly resiliently deformable material, such as rubber, to cushion their engagement with the chain, and if desired, the rollers may be formed without teeth 101 and having continuous annular outer surfaces.

To now describe the operation of the bicycle illustrated in FIGS. 1 through 12, assume initially that the chain is shifted to the condition illustrated in FIG. 7, in which the forward end of the chain is in engagement with the larger forward sprocket wheel 23a, and the rear end of the chain is in engagement with the smallest one of the rear circular sprocket wheels. As a rider now pedals the forward sprocket wheel assembly, power is transmitted from the forward wheel 23a through chain 25 to the engaged rear sprocket wheel, to thereby drive the rear wheel of the bicycle and cause its forward advancement. When the pedals are in the positions of FIGS. 1 and 3, the rider is able to apply maximum power to the pedals, since the pedal line 38 is disposed approximately perpendicularly to a force application line which may be drawn (along one of the frame members 30) from the center of seat 12 of the bicycle to the axis of the shaft 20 to which the pedals are connected. This maximum torque is applied to chain 25 at a maximum effective speed transmission ratio (minimum effective torque transmission ratio). As the pedals turn through the next 90 degrees, the forward end of the upper run of the chain engages portions of the oblong sprocket wheel which progressively decrease in effective diameter, to thereby progressively decrease the speed transmission ratio of the arrangement, and increase its torque transmission ratio to a "low gear" condition. The extreme of this condition is reached when the pedals are exactly 90 degrees beyond the position of FIG. 1, when the minor axis of the elliptical sprocket wheel rather than its major axis extends directly vertically, so that the sprocket wheel has a minimum effective moment arm. Beyond that position, the effective speed transmission ratio begins to again increase, and the effective moment arm of the sprocket wheel correspondingly increases until the major axis of the sprocket wheel is again vertical, following which the cycle just described repeats.

By virtue of the provision of the oblong drive sprockets, the rather small forces which can be exerted by the rider to move the pedals horizontally in the upper and lower portions of their travel are compensated for, and are able to maintain a uniform rate of advancement of the bicycle even during these periods when relatively small foot applied torque is available. As the sprocket wheel and pedals turn about axis 21, the torque and speed transmission ratios between the pedals and rear wheel 15 change progressively and continually to at all times maintain an optimum relationship between the available torque and the transmission ratios. Thus the illustrated arrangement tends to produce a much more uniform bicycle speed, and more efficient use of available power.

Each time the elliptical sprocket wheel turns through 90 degrees, the upper and lower runs of chain 25 must move vertically through the range of travel illustrated in FIG. 2. However, by virtue of the spreading of the upper and lower runs of the chain to a condition approaching and preferably equal to the dimension 72 of the sprocket wheel (a diameter midway between its major and minor diameters), the detrimental effect of the vertical oscillation is minimized, and the extent to which spring pressed rollers 52 and 53 must compensate for changes in effective length of the chain is also minimized. At the same time, guide rollers 80 of unit 77 continually engage the chain and guide it directly forwardly onto the oblong sprocket wheel, in the plane of this sprocket wheel, so that there is no lateral oscillatory movement of the chain resulting from the oblong shape of the sprocket wheel. There is consequently no danger of the chain being displaced from the engaged elliptical sprocket wheel by either vertical or horizontal oscillatory movement of the chain.

If control element 66 is actuated to shift carrier 54 and its wheels 52 and 53 laterally, this movement acts to shift the chain onto any desired one of the rear sprocket wheels 26a, 26b, 26c, 26d and 26e, with spring pressed carrier 54 and its wheels 52 and 53 automatically compensating for the change in diameter of the engaged sprocket wheel. Similarly, element 93 may be actuated to shift shaft 86 and its carried rollers 80 laterally from a position in which the chain between rollers 80 advances directly forwardly onto large sprocket wheel 23a, to a position in which the chain is directed by rollers 80 direcly forwardly onto the smaller elliptical sprocket wheel 23b. Thus, unit 77 acts as a forward shifter, and after such shifting movement functions to direct the forward portion of the chain precisely forwardly onto the selected one of the two elliptical sprocket wheels. In either positions, rollers 80 are free to swing upwardly and downwardly with the upper run of the chain, as the chain engages different portions of the elliptical sprocket wheel, by virtue of the mounting of rollers 80 to arm 84 which is mounted by bushing 85 to swing about shaft 86. Regardless of which rear sprocket wheel and which forward sprocket wheel is selected in any of the numerous different possible settings of the gear change mechanism, guide rollers 80 always function to continuously engage and continuously direct the forward portion 78 of the chain directly forwardly onto the selected one of the two elliptical sprocket wheels. Also, rollers 80 and their carried plate 83 act to automatically pivot about axis 107 (FIGS. 11 and 12) to always maintain the rollers (by aligning forces exerted by the chain on flanges 103) in proper orientation for effective engagement with the chain.

Instead of the illustrated rollers 80, it is contemplated that other guide elements may be carried by arm 84, such as for example rollers engaging the top and bottom sides of the chain, or if desired nonrotating guide members. However, these guides can not be of the type conventionally employed as gear shifting elements, which elements engage the chain only during shifting, and under no load, but rather the guides of the present invention must continuously engage and effectively guide the chain onto the sprocket wheel while the chain is in operative engagement with and continues to engage a particular pair of front and rear sprockets, and through the entire cycle of rotation of the sprockets, while under full load.

It is also contemplated that, if desired, the spreader wheels 52 and 53 may be mounted to the bicycle frame at a position farther forwardly than in FIG. 1. Such an arrangement is shown, for example, in FIG. 13, where the illustrated bicycle may typically have only one rear sprocket 126c, and one or more forward elliptical sprocket wheels 23c. The spreading mechanism may include two wheels 52c and 53c mounted to a carrier 54c which is pivotally mounted to a bracket 50c secured rigidly to frame member 11c of the bicycle. Carrier 54c and wheel 53c are spring urged pivotally about point 67c in the clockwise direction indicated by the arrow (as are the corresponding carrier 54 and its rollers in FIG. 1), to take up looseness in the chain. The vertical spread 70c between line 73c, which is tangent to the upper side of wheel 126, and line 74c, which is tangent to the lower side of wheel 53c, (corresponding to dimension 70 in FIG. 3) is preferably midway between the major and minor diameters of the elliptical sprocket wheels. Also, wheels 52c and 53c may be shifted farther toward the front of the bicycle, or farther toward the rear, so long as the effective vertical spread of the upper and lower chain runs (dimension 70) is as discussed in detail in connection with FIGS. 1 through 12.

FIGS. 14 through 20 show another form of the invention which has certain structural and operational advantages over the previously discussed forms. In this arrangement, the two forward sprocket wheels 23d and 23e may be identical with sprocket wheels 23a and 23b of FIG. 3, except as to the angular relationship of pedal arms 18d and 19d with respect to the sprocket wheels. Chain 25d is directed along a path such that its upper and lower runs 68d and 69d approach and leave the oblong sprocket wheels at an inclination, rather than essentially horizontally, so that the effective maximum diameter position of each oblong sprocket wheel is the essentially inclined position of FIGS. 14 and 15, in which the major diameter 47d of the oblong wheels is inclined upwardly and forwardly as shown. In that position, the upper run 68d, as it extends forwardly, first contacts the maximum diameter portion of the engaged oblong sprocket wheel. Also, in order to allow the application of maximum force to the pedals in this maximum diameter setting of the sprocket wheel, the pedal line 38d, indicating in FIG. 15 the position of pedal arms 18d and 19d, is disposed at an inclination angle "b" with respect to a horizontal plane 37d, which angle corresponds in size to angle "a" of FIG. 2.

At the location of the rear axle of the bicycle, chain 25d may be selectively shifted onto any one of a series of rear sprockets 126d, corresponding to the sprockets 26a through 26e of FIG. 4. Beneath these sprockets the chain passes about a shifter and takeup mechanism 46d corresponding to structure 46 of FIG. 4. The primary difference between the FIG. 14 arrangement and the previously described forms of the invention resides in the manner in which chain 25d is directed about two idler wheels 111 and 112 which control the spreading, inclination and guiding of the upper and lower runs as they approach and leave the oblong sprocket wheels. The first of these idler wheels 111 may be a sprocket wheel and preferably engages the underside of upper run 68d at a location near the oblong drive wheels, with the teeth of wheel 111 extending upwardly into the apertures of the chain in sufficiently closely fitting relation to prevent lateral or transverse movement of the chain relative to wheel 111. This wheel 111 deflects an intermediate portion of the upper run upwardly, so that this run first advances angularly upwardly as it extends forwardly from rear sprocket 126d, and then advances angularly downwardly toward the oblong sprocket wheel 23d or 23e.

Similarly, wheel 112 engages the underside of lower run 69d, to deflect an intermediate portion thereof upwardly as illustrated. This wheel may be a sprocket wheel or may be a peripherally annular wheel as seen in FIG. 17 which is received and confined between the depending side flanges 212 of the chain as seen in FIG. 21. The idlers 111 and 112 serve several purposes, one of which is to maintain the spacing 70d between the upper and lower runs of the chain, at the locations of these idlers, in the same relation to the dimensions of the oblong sprocket wheels as has been discussed in connection with the corresponding spacing 70 of FIG. 2, and its relation to the sprocket wheel 23a. The extreme positions to which the upper and lower runs 68d and 69d of FIGS. 14 and 15 oscillate are illustrated at 168d and 169d, and the intermediate or midpositions, half way between the extremes, are represented at 73d and 74d. As in the other forms of the invention, the spacing 70d is desirably less than the major diameter of each of the oblong sprocket wheels, and more than the minor diameter, and for best results is substantially equal to a dimension midway between the major and minor diameters of one of the wheels, preferably the larger wheel. In this way, I minimize the change in chain length required to compensate for the vertical oscillation of the forward portions of the chain, and further attain the added advantage of minimizing the portion of each run of the chain which must oscillate, that is, I eliminate all vertical oscillation of the rear portions and isolate the oscillation in the portions of the chain which are forwardly of idlers 111 and 112.

The positioning of upper idler 111 at the illustrated elevated location, to deflect the upper run 68d well above the highest portion of the larger oblong sprocket wheel, eliminates the necessity for shifting of idler 111 upwardly and downwardly in the manner of the two rollers 80 in FIG. 9. Further, sprocket 111 serves the added function of shifting the forward portion of the chain between the two forward sprocket wheels 23d and 23e, and acts in each set position to direct the forward portion of the upper run 68d onto the top of the sprocket wheel in precise alignment therewith, that is, so that the chain lies precisely within the plane of the sprocket wheel as the upper run advances from idler 111 to the drive sprocket. This of course is the same alignment feature discussed in connection with FIG. 7, to avoid lateral oscillation of the forward portion of the upper run.

Idler wheel 111 turns about a horizontal axis 113 which is parallel to the horizontal axes of sprocket wheels 23d and 23e, and the axis of the rear wheel of the bicycle. Wheel 111 is manually shiftable along that axis between positions of alignment with the two front sprocket wheels, typically by actuation of a control handle represented at 114, which may shift upwardly between the full line and broken line positions of FIG. 19, and by such movement may act to cam wheel 111 from its full line position to its broken line position of that figure. The sprocket wheel may be secured to upright frame member 115 by a clamp 116 disposed about that frame member, and having a tubular mounting shaft portion 117 about which there is mounted an annular sleeve 118 which is spring urged to the right in FIG. 19 by a tension spring 119. Sprocket wheel 111 is rotatably mounted about annular part 118, by a bearing having an inner race 120 rigidly secured to part 118, with the bearing being designed to act sufficiently as a thrust bearing to hold the sprocket wheel in fixed axial position relative to part 118. The lower end of actuating handle or arm 114 may carry a cam 121, acting against a cam face 122 and the element 118 to cam idler 111 to its broken line position when element 114 is shifted upwardly to its broken line position, in which a second of two detent shoulders 123 releasably retains element 114 against unwanted downward retraction. If desired, element 117 or a similar mounting post or element may be rigidly welded or otherwise secured directly to member 115, rather than being a separate part clamped in position.

The lower idler 112 may be mounted to rearwardly extending frame element 124 by an appropriate bracket 125, which may consist of a single piece of sheet material deformed as shown in FIGS. 17 and 18 to form a tubular upper portion 126 disposed about frame element 124, and carrying two depending spaced arms or portions 127 between which the idler 112 is rotatably mounted. As seen in FIG. 18, tubular portion 126 of bracket 125 may have an internal diameter slightly greater than the external diameter of frame tube 124, so that the entire bracket 125 and idler 112 may shift or pivot slightly about a vertical axis 128, and also so that the bracket may swing about the generally horizontal axis of tube 124 to enable lateral shifting of wheel 112 as to the broken line position of FIG. 17. These two types of shifting movement allow for best possible alignment of the wheel 112 with different tones of the front and rear sprockets 23d, 23e and 126d.

In using the form of the invention shown in FIGS. 14 through 20, the oblong sprocket wheels act, as in the other forms of the invention, to assume a maximum effective diameter when the pedals are in the position of FIG. 14, in which maximum force can be applied by the rider, with the oblong wheels having a minimum effective diameter when the pedals are offset 90 degrees from their FIGS. 14 and 15 positions. The idlers 111 and 112 minimize both vertical and lateral oscillation of the chain, and by virtue of their unique positioning positively prevent the chain from jumping off of the oblong sprocket wheels. In each of its set positions, idler sprocket 111 must be held against any axial shifting movement as a result of the forces exerted by the chain, and for this purpose spring 119 of FIG. 19 must be strong enough to prevent lateral displacement of the sprocket 111 from its properly aligned position by the chain forces.

Idler 112 also serves, if the pedals are rotated reversely, to guide the chain during such backward pedalling in a manner effectively preventing the chain from jumping off of the drive sprocket.

Idler 111 should preferably be as far as possible forward of the rear sprockets 126d, to minimize misalignment with those sprockets, and thereby minimize the friction which may develop between the chain and wheels 126d and 111. Preferably, wheel 111 is sufficiently far forward to actually be located directly vertically above a portion of the coacting drive wheel 23d or 23e, as shown. In a bicycle having wheel 111 positioned in the same location illustrated in FIG. 14, it has been found that the misalignment angularity of the chain between wheels 111 and 126d, and with respect to a true front to rear direction, may be reduced to about 3½°.

I claim:
1. A bicycle including front and rear ground engaging wheels, a frame supported by said wheels, an oblong pedal actuated drive wheel having major and minor dimensions, an endless member driven by said oblong wheel and having upper and lower runs extending rearwardly therefrom, a plurality of additional wheels of different sizes selectively engageable with and driven by said endless member rearwardly of said oblong wheel and connected to said rear wheel in axial alignment therewith to drive it, said additional wheels being substantially smaller in diameter than an optimum dimension midway between said major and minor dimensions of the oblong wheel, a movable wheel assembly located essentially beneath said additional wheels and operable to shift said endless member into engagement with different ones of said additional wheels, said movable wheel assembly being positioned to displace a rear portion of said lower run downwardly lower than said additional wheels and to thereby spread said upper and lower runs of the endless member relatively apart rearwardly of said oblong wheel to a spacing closer to said optimum dimension and yielding means urging said movable wheel assembly in a direction to take up slack in the endless member resulting from said shifting thereof and to also take up slack resulting from rotation of the oblong drive wheel.

2. A bicycle including front and rear ground engaging wheels, a frame supported by said wheels, an oblong pedal actuated drive wheel having major and minor dimensions, an endless member driven by said oblong wheel and having upper and lower runs extending therefrom, at least one additional wheel engageable with and driven by said endless member rearwardly of said oblong wheel and connected to said rear wheel to drive it, and guide means deflecting both of said upper and lower runs of the endless member upwardly at locations forwardly of said additional wheel and spaced from said oblong wheel in a relation requiring said upper run to advance downwardly as it approaches said oblong wheel, and requiring said lower run to simultaneously advance upwardly as it leaves the oblong wheel.

3. A bicycle including front and rear ground engaging wheels, a frame supported by said wheels, an oblong pedal actuated drive wheel having major and minor dimensions, an endless member driven by said oblong wheel and having upper and lower runs extending therefrom, at least one additional wheel engageable with and driven by said endless member rearwardly of said oblong wheel and connected to said rear wheel to drive it, said additional wheel being substantially smaller in diameter than an optimum dimension midway between said major and minor dimensions of the oblong wheel, and guide means deflecting both of said upper and lower runs of the endless member upwardly at locations forwardly of said additional wheel and spaced from said oblong wheel in a relation requiring said upper run to advance downwardly as it approaches said oblong wheel, and requiring said lower run to the simultaneously advance upwardly as it leaves the oblong wheel, said guide means being positioned to spread said upper and lower runs of the endless member relatively apart to a spacing between said major and minor dimensions of the oblong wheel.

4. A bicycle including front and rear ground engaging wheels, a frame supported by said wheels, an oblong pedal actuated drive wheel having major and minor dimensions, an endless member driven by said oblong wheel and having upper and lower runs extending therefrom, at least one additional wheel engageable with and driven by said endless member rearwardly of said oblong wheel and connected to said rear wheel to drive it, said additional wheel being substantially smaller in diameter than an optimum dimension midway between said major and minor dimensions of the oblong wheel, and two guide rollers turning about generally horizontal axes engageable upwardly against the undersides of said upper and lower runs respectively of the endless member, and deflecting said runs upwardly at locations forwardly of said additional wheel and spaced from said oblong wheel in a relation requiring said upper run to advance at an inclination forwardly and downwardly as it approaches said oblong wheel, and requiring said lower run to simultaneously advance at an inclination rearwardly and upwardly as it leaves the oblong wheel, said guide rollers being positioned to spread said upper and lower runs of the endless member relatively apart to a spacing approximately equal to said optimum dimension.

5. A bicycle including front and rear ground engaging wheels, a frame supported by said wheels, an oblong pedal actuated drive wheel having major and minor dimensions and turning essentially within a predetermined plane, an endless member driven by said oblong wheel and having upper and lower runs extending therefrom, at least one adidtional wheel engageable with and driven by said endless member rearwardly of said oblong wheel and connected to said rear wheel to drive it, said additional wheel being substantially smaller in diameter than an optimum dimension midway between said major and minor dimensions of the oblong wheel, and two guide rollers turning about generally horizontal axes engageable upwardly against the undersides of said upper and lower runs respectively of the endless member, and deflecting said runs upwardly at locations forwardly of said additional wheel and spaced from said oblong wheel in a relation requiring said upper run to advance at an inclination forwardly and downwardly as it approaches said oblong wheel, and requiring said lower run to simultaneously advance at an inclination rearwardly and upwardly as it leaves the oblong wheel, said guide rollers being positioned to spread said upper and lower runs of the endless member relatively apart to a spacing approximately equal to said optimum dimension, said additional wheel being offset slightly laterally from a position of accurate front to rear alignment with said oblong wheel, and one of said guide wheels engaging said upper run of said endless member continuously while said endless member is being driven by said oblong wheel and at a location to continuously deflect said upper run sligthly laterally at said location so that said member follows a first path forwardly to said one guide wheel at an angle to said plane of said oblong wheel and then turns through a slight angle to advance along a path essentially within said plane and onto said oblong wheel in precise alignment therewith.

6. A bicycle including front and rear ground engaging wheels, a frame supported by said wheel, an oblong pedal actuated drive wheel mounted to said frame to turn about an axis and having maximum and minimum dimension portions, an endless member driven by said oblong wheel and having upper and lower runs extending therefrom to drive said rear ground engaging wheel, with said upper run alternately extending to said maximum and minimum dimension portions as the oblong drive wheel turns, and with said upper run in all positions extending at an inclination downwardly and forwardly in approaching said oblong wheel, a seat on the frame higher than said oblong wheel and rearwardly thereof, and pedals connected to said oblong wheel to drive it and turning about said axis thereof and positioned for actuation by the feet of a person on said seat, said pedals and said endless member and oblong wheel being so related that, in a predetermined maximum drive position in which the forward end of said upper run first contacts the oblong wheel at one of its maximum dimension portions, the oblong wheel in that maximum drive position has said one of its maximum dimension portions offset forwardly of said axis, and also in that maximum drive position said pedals are slightly circularly behind predetermined positions in which they extend directly horizontally.

7. A bicycle including front and rear ground engaging wheels, a frame supported by said wheels, an oblong pedal actuated drive wheel having major and minor dimensions and turning essentially within a predetermined plane, an endless member driven by said oblong wheel and having upper and lower runs extending rearwardly therefrom, at least one additional wheel engageable with and driven by said endless member rearwardly of said oblong wheel and connected to said rear wheel to drive it, said additional wheel being offset slightly laterally from a position of accurate front to rear alignment with said oblong wheel, and guiding means engaging said upper run of said endless member at a location forwardly of said additional wheel and continuously while said endless member is being driven by said oblong wheel and acting to continuously deflect said upper run slightly laterally at said location so that said member follows a first path forwardly to said location at an angle to said plane of said oblong wheel and then turns through a slight angle to advance along a path essentially within said plane and onto said oblong wheel in precise alignment therewith.

8. A bicycle as recited in claim 7, in which said guiding means include rotatable roller guide means.

9. A bicycle as recited in claim 7, in which said guiding means include a roller turning about a horizontal axis and engageable upwardly against the underside of said upper run.

10. A bicycle as recited in claim 7, in which said guiding means include a pair of guiding rollers engaging opposite sides of said upper run.

11. A bicycle including front and rear ground engaging wheels, a frame supported by said wheels, an oblong pedal actuated drive wheel having major and minor dimensions and turning essentially within a predetermined plane, an endless member driven by said oblong wheel and having upper and lower runs extending rearwardly therefrom, at least one additional wheel engageable with and driven by said endless member rearwardly of said oblong wheel and connected to said rear wheel to drive it, said additional wheel being offset slightly laterally from a position of accurate front to rear alignment with said oblong wheel, guiding means engaging said upper run of said endless member at a location forwardly of said additional wheel and continuously while said endless member is being driven by said oblong wheel and acting to continuously deflect said upper run slightly laterally at said location so that said member follows a first path forwardly to said location at an angle to the plane of said oblong wheel and then turns through a slight angle to advance on to said oblong wheel along a path which is essentially within said plane and precisely aligned with said oblong wheel, means mounting said guiding means for up and down movement with said upper run of the endless member as it successively engages said major and minor dimensions of said oblong wheel.

12. A bicycle including front and rear ground engaging wheels, a frame supported by said wheels, an oblong pedal actuated drive wheel having major and minor dimensions and turning essentially within a predetermined plane, an endless member driven by said oblong wheel and having upper and lower runs extending rearwardly therefrom, at least one additional wheel engageable with and driven by said endless member rearwardly of said oblong wheel and connected to said rear wheel to drive it, said additional wheel being offset slightly laterally from a position of accurate front to rear alignment with said oblong wheel, a pair of guiding rollers engaging opposite sides of said upper run of said endless member at a location forwardly of said additional wheel and continuously while said endless member is being driven by said oblong wheel and acting to continuously deflect said upper run slightly laterally at said location so that said member follows a first path forwardly to said location at an angle to said plane of said oblong wheel and then turns through a slight angle to advance onto said oblong wheel along a path which is essentially within said plane and precisely aligned with the oblong wheel, and means mounting said guiding rollers for up and down movement with said upper run of the endless member as it successively engages said major and minor dimensions of said oblong wheel.

13. A bicycle including front and rear ground engaging wheels, a frame supported by said wheels, an oblong pedal actuated drive wheel having major and minor dimensions and turning essentially within a predetermined plane, an endless member driven by said oblong wheel and having upper and lower runs extending rearwardly therefrom, at least one additional wheel engageable with and driven by said endless member rearwardly of said oblong wheel and connected to said rear wheel to drive it, said additional wheel being offset slightly laterally from a position of accurate front to rear alignment with said oblong wheel, and a pair of guiding rollers engaging opposite sides of said upper run of said endless member at a location forwardly of said additional wheel and continuously while said endless member is being driven by said oblong wheel and acting to continuously deflect said upper run slightly laterally at said location so that said member follows a first path forwardly to said location at an angle to said plane of said oblong wheel and then turns through a slight angle to advance onto said oblong wheel along a path which is essentially within said plane and precisely aligned with the oblong wheel, said endless member being a chain having links forming irregular surfaces at opposite sides of the chain, said rollers having irregular surfaces shaped to mesh with said irregular surfaces of the chain.

14. A bicycle including front and rear ground engaging wheels, a frame supported by said wheels, two pedal actuated drive wheels of different sizes connected together in side by side relation to turn in unison, at least one of said wheels being oblong and having major and minor dimensions and turning essentially within a predetermined plane, an endless member adapted to be selectively driven by either of said drive wheels and having upper and lower runs extending rearwardly therefrom, at least one additional wheel engageable with and driven by said endless member rearwardly of said drive wheels and connected to said rear wheel to drive it, said additional wheel being offset slightly laterally from a position of accurate front to rear alignment with said oblong wheel, guiding means engaging said upper run of said endless member at a location forwardly of said additional wheel and continuously while said endless member is being driven by said oblong wheel and acting during that time to continuously deflect said upper run slightly laterally at said location so that said member follows a first path forwardly to said location at an angle to said plane of said oblong wheel and then turns through a slight angle to advance onto the engaged oblong wheel along a path which is essentially within said plane and precisely aligned with the oblong wheel, and means for shifting said guiding means laterally to direct said endless member forwardly onto either of said drive wheels in precise alignment therewith while continuously engaging said member during shifting and while said guiding means are in either set position.

15. A bicycle as recited in claim 14, in which there are a plurality of said additional wheels in side by side relation at said rear wheels and selectively engageable by said endless member, said guiding means including a pair of rollers engaging opposite sides of said endless member and mounted for up and down movement with said upper run.

16. A bicycle including front and rear ground engaging wheels, a frame supported by said wheels, an oblong pedal actuated drive wheel having major and minor dimensions and turning essentially within a predetermined plane, an endless member driven by said oblong wheel and having upper and lower runs extending therefrom, at least one additional wheel engageable with and driven by said endless member rearwardly of said oblong wheel and connected to said rear wheel to drive it, said additional wheel being substantially smaller in diameter than an optimum dimension midway between said major and minor dimensions of the oblong wheel, guiding means directing said endless member between said drive wheel and said additional wheel and including means spreading said upper and lower runs of the endless member relatively apart to a spacing closer to said optimum dimension, said guiding means engaging said upper run of said endless member at a location rearwardly of said oblong wheel and continuously while said endless member is being driven by said oblong wheel and acting to continuously deflect said upper run slightly laterally at said location so that said member follows a first path forwardly to said location at an angle to the plane of said oblong wheel and then turns through a slight angle to advance onto said oblong wheel along a path which is essentially within said plane and precisely aligned with the oblong wheel.

References Cited by the Examiner

UNITED STATES PATENTS

| | | | |
|---|---|---|---|
| 596,289 | 12/1897 | Smith | 74—243 |
| 648,615 | 5/1900 | Hamilton et al. | 74—240 |
| 3,121,575 | 2/1964 | Bourgi | 280—236 |

FOREIGN PATENTS

| | | |
|---|---|---|
| 645,447 | 6/1928 | France. |
| 747,503 | 3/1933 | France. |
| 780,223 | 1/1935 | France. |
| 811,522 | 1/1937 | France. |
| 963,392 | 6/1949 | France. |
| 1,204,027 | 10/1959 | France. |
| 17,026 | 1896 | Great Britain. |
| 449,504 | 6/1936 | Great Britain. |
| 328,020 | 7/1935 | Italy. |
| 423,693 | 7/1943 | Italy. |
| 593,692 | 7/1959 | Italy. |

KENNETH H. BETTS, *Primary Examiner.*